United States Patent [19]

Saeki et al.

[11] 4,126,292
[45] Nov. 21, 1978

[54] MOLD DIE

[75] Inventors: Jun-Ichi Saeki; Aizo Kaneda, both of Yokohama; Keizo Otsuki, Higashiyamato, all of Japan

[73] Assignee: Hitachi, Ltd., Japan

[21] Appl. No.: 811,141

[22] Filed: Jun. 28, 1977

[30] Foreign Application Priority Data

Jul. 5, 1976 [JP] Japan ................................. 51-78969

[51] Int. Cl.² ............................................. B29F 1/00
[52] U.S. Cl. ..................................... 249/110; 425/572
[58] Field of Search ................ 249/110, 107; 425/572, 425/573, 570, 581, 588; 264/328

[56] References Cited

U.S. PATENT DOCUMENTS

| 2,672,653 | 3/1954 | Simpkins et al. ................. 249/110 X |
| 3,940,224 | 2/1976 | Armour .............................. 425/538 |

FOREIGN PATENT DOCUMENTS

| 2,011,653 | 9/1971 | Fed. Rep. of Germany ........... 425/572 |
| 2,457,678 | 6/1976 | Fed. Rep. of Germany ........... 249/110 |
| 1,217,564 | 5/1960 | France ..................................... 425/570 |

Primary Examiner—Francis S. Husar
Assistant Examiner—William R. Briggs
Attorney, Agent, or Firm—Craig & Antonelli

[57] ABSTRACT

A mold die including two or more cavities shaped to profile the configuration of mold products, a pot serving as a lead-in portion for resin of a tablet-form, or a sprue serving as a lead-in portion for molten resin, a runner leading to the pot or sprue, and gates branching from the runner and leading to respective cavities, the aforesaid gates having given convergent slopes at their exits to the cavities. The cross-sectional area of the runner is progressively decreased in the direction away from the pot or sprue, and the convergent slopes of the gates are progressively increased in the direction away from the pot or sprue, in a manner that the sum of a pressure drop in a runner portion and a pressure drop in a gate portion may be made equal for each of the cavities, thereby minimizing a difference in timing of resin to arrive respective cavities, and rendering the velocity of resin flowing into respective cavities equal to one another.

2 Claims, 23 Drawing Figures

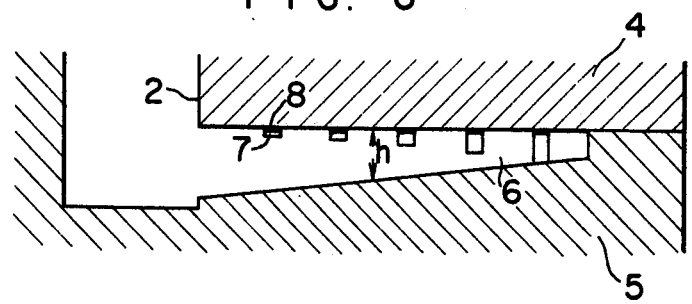
FIG. 6
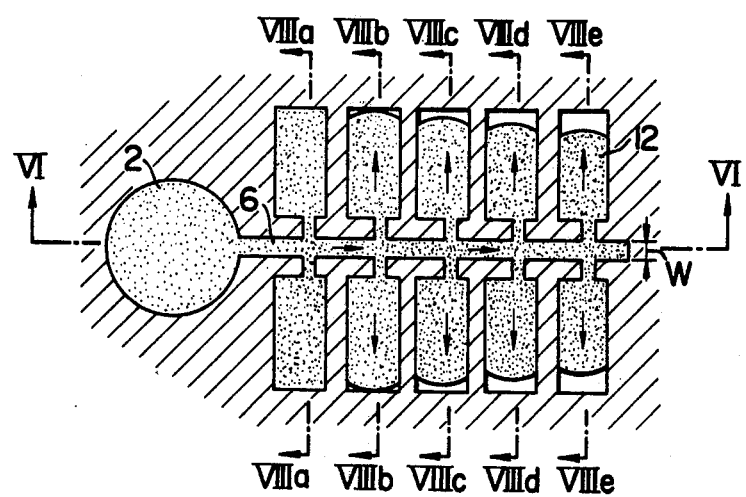
FIG. 7
FIG.8a  FIG.8b  FIG.8c  FIG.8d  FIG.8e
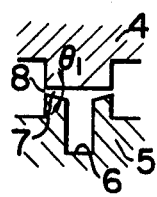 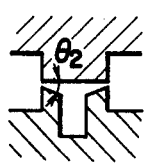 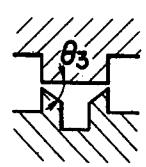 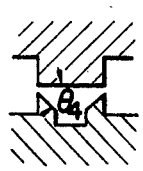 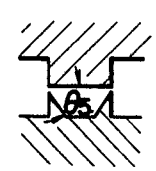

MOLD DIE

This invention relates to a mold die for use with resin molding machines.

In the resin molding such as for resin-molded IC, LSI and the like, many attempts have been proposed to improve the quality of mold products as well as to reduce the manufacturing cost by increasing the number of products per one shot.

In this respect, the prior art mold dies for molding a plurality of products (for instance several tens products) per one shot suffer from the following problems. In other words, in the initial phase of transfer of molten resin, the flow rate of resin flowing along a runner is decreased, as the resin goes away from the pot, because of the resin being distributed into intermediate cavities positioned on the way from the pot to the last cavities. In this case, the cross sectional area of the runner is constant, so that a decrease in the flow rate of resin directly leads to a reduction in fluid velocity, with the result that the fill-starting time for a cavity is progressively delayed, as the cavity is spaced farther from the pot. In addition, the shapes of gates for respective cavities are the same, so that the longer the length of the runner, the larger will be a pressure drop in a runner portion up to each cavity. Accordingly, the farther the cavity is positioned from the pot, the larger will be a pressure drop, and the lower will be a force to force resin into a cavity, i.e., the velocity of resin flowing into a cavity.

In addition, the cavities are in turn filled in the order of cavities which are closer to the pot, so that the velocity of resin is progressively increased, as the cavity is spaced farther from the pot in the later part of the transfer.

In this manner, the prior art mold die suffers from marked differences in fill starting time and filling condition of resin into respective cavities. This apparently exerts adverse effects on various characteristics of mold products, such as formation rate of voids, deformation of inserts, adhesive characteristic of resin to inserts, and the like.

Anyway, the aforesaid shortcomings are owing to a difference in filling condition of resin into respective cavities. Accordingly, there arises a demand to have a mold die which eliminates these shortcomings, thereby providing consistent qualities of mold products.

For achieving equal filling velocity of resin in respective cavities, the energy which is lost by resin due to its flowing into the respective cavities, i.e., pressure drops in resin at respective cavities should be equal to each other.

In the field of thermoplastic molding, the cross-sectional area of a gate at its exit is progressively increased, as the exit of the gate is spaced farther from the pot, (a convergent slope is maintained constant), and then the sum of pressure drops in a runner portion and a gate portion is equalized for each of cavities. (For example, reference be made to Mold-Filling Studies for the Injection Molding of Thermoplastic Materials, Part 1; by G. WILLIAMS and H. A. LORD, Polymer Engineering and Science 15 (8), (1975)).

However, if the width of the gate exit is increased to increase the cross sectional area of the gate, then there results a turbulent flow of resin within a cavity, thus leading to undesirable defects in appearance of mold products, such as voids, weld marks, snake marks and the like. On the other hand, if the height of the gate is increased to increase the cross sectional area of the gate, then when a mold product is removed from a cavity, the product fails to be broken at a given point of the runner, i.e., at the exit of the gate, thus damaging the product, with an accompanying lowered yield thereof.

It is a first object of the present invention to equalize fill velocities of resin flowing into respective cavities in a mold die in which the number of cavities is equal to or more than that of a conventional mold die.

It is a second object of the present invention to make resin filling completion time concurrent for respective cavities as well as to equalize fill velocities of resin flowing into respective cavities in a mold die in which the number of the cavities is equal to or more than that of a conventional mold die.

In order to attain the first object, the present invention takes measures wherein convergent slopes of gates (that is, angles defined by the upper and lower surfaces of the gates) are made larger as the gates are located far away from a pot with the exits of the gates connected to respective cavities being maintained constant in size, and wherein the sum of pressure drops in a gate portion and in a runner portion is uniform for each of the cavities. According to the measures, the shape and size of the gate exit (opening) is not changed, so that there results no turbulence of resin flowing therein, and mold products may be removed from the runner in a given position, respectively.

To attain the second object of the present invention the lowering in velocities of resin flowing along the runner, due to the resin being distributed into intermediate cavities on its way from the pot, should be prevented.

According to the present invention, the cross sectional area of a runner is progressively or continuously reduced in the direction farther from the pot, thereby minimizing a drop in fluid velocity of resin in the runner, and then minimizing a difference in fill time (the difference in fill starting time of resin to flow into respective cavities). Likewise, a convergent slope of a gate is progressively increased as the gate is spaced farther from the pot, so that the pressure drops in a gate portion and a runner portion are equalized for each of cavities, thereby attaining the second object of the present invention.

FIGS. 3 and 4 are views illustrative of details of a mold die according to the prior art, and filling condition of molten resin into the die, in which FIG. 3 is a cross-sectional view taken along the line III — III of FIG. 4, and FIG. 4 is a view as seen from an arrow direction IV in FIG. 3;

FIGS. 6 to 8 are view illustrative of a first embodiment of the invention, in which FIG. 6 is a cross-sectional view taken along the line VI — VI of FIG. 7, FIG. 7 is a plan view of a mold die, FIGS. 8A to 8E are cross-sectional views taken along the lines VIIIA — VIIIA, VIIIB — VIIIB, VIIIC — VIIIC, VIIID — VIIID, and VIIIE — VIIIE of FIG. 7;

FIGS. 9 to 12 show a second embodiment of the invention, in which FIG. 9 is a side view of a runner for minimizing a difference in fill starting time of resin into cavities, FIG. 10 is a front view thereof, FIG. 11 is a view showing the arrangement of cavities, and FIG. 12 is a perspective view of a gate;

FIGS. 13 and 14 shows the results of calculation for the second embodiment of the invention, in which FIG. 13 is a plot illustrative of a pressure drop in a runner portion, and FIG. 14 is a plot showing a pressure drop in a gate portion;

Figure 1:
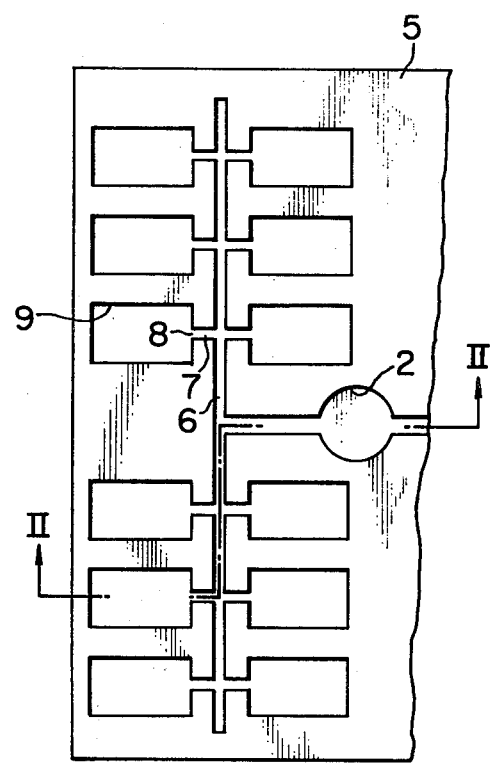
FIG. 1 is a plan view of a mold die for use in molding a plurality of products at one shot.

Description will be given of the molding process in a mold die according to the prior art, with reference to FIGS. 1 to 4. FIG. 1 is a plan view of a mold die with an upper half of a die removed. FIGS. 2a to 2d are cross-sectional views taken along the line II — II of FIG. 1. In these figures, there are shown an upper half of a die at 4, and a lower half at 5. A cylindrical-shaped pot 2 extends through the upper half of the mold die at the central portion thereof. Shown at 6 is a runner provided in the lower half 5 to communicate with the pot 2. The runner 6 is in the form of a channel having an inverted trapezoid cross-section. Shown at 7 is a gate provided in the lower half 5 to branch away from the runner 6. The gate 7 has a cross-section which is reduced towards its exit 8 such that the upper and lower bottom surfaces of the gate 7 gradually approach to each other.

Meanwhile, an angle made between the upper and lower bottom surfaces of the gate 7 is referred to as a convergent slope $\theta$ of the gate. Shown at 9 is a cavity defined in the upper and lower halves 4, 5 therebetween and communicated with the gate 7 through the exit 8 thereof. The respective cavities 9 are shaped to model the configuration of products. Shown at 10 are inserts, such as lead frames for resin molded IC, which are preset the cavities 9 as required. Shown at 3 is a plunger adapted to slidingly reciprocate within the pot 2 in the vertical direction, and shown at 11 are ejector pins adapted to eject a mold product from the mold die.

As the mold die shown in FIGS. 1 and 2a to 2d are symmetric with respect to the pot 2, the right-hand portion of the mold die is omitted in the drawings.

Description will now be turned to the process of molding thermoset resin with reference to FIGS. 2a to FIG. 2d.

Figure 2A:
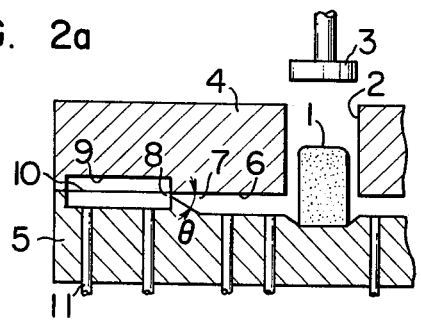
FIGS. 2a to 2d are cross-sectional views of the die, taken along the line II — II of FIG. 1.

Firstly, a tablet 1 made by pre-forming resin is placed in the pot 2. (FIG. 2a)

Figure 2B:
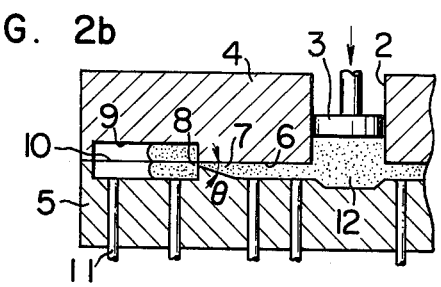

Then, the tablet 1 is heated by a heater (not shown) embedded within the mold die to provide molten resin 12. The molten resin 12 is forced downward by the plunger 3 to fill the cavities 9 via runner 6, gate 7 and gate exit 8. (FIG. 2b)

Figure 2C:
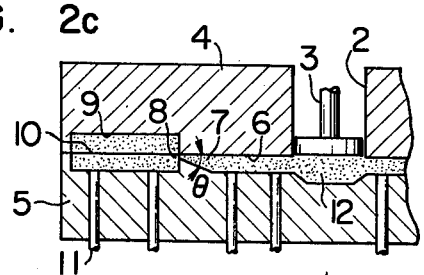

After having filled the cavities 9, the molten resin 12 is further heated by a heater (not shown) embedded within the mold die to start curing. (FIG. 2c)

Figure 2D:
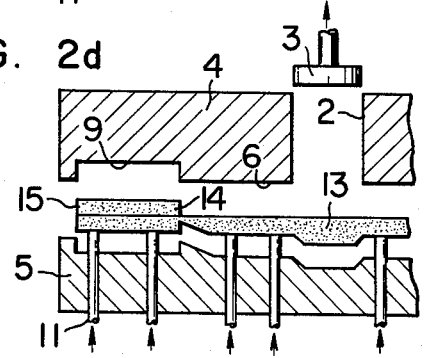

After the lapse of a predetermined cure time, the upper and lower halves 4, 5 of the mold die are opened to be separated from each other in the vertical direction, permitting mold products 13 to be ejected from the mold die by means of the ejector pin 11. Finally, the mold products 13 are broken at 14 (in the position corresponding to the exits 8 of the gate) to provide finished products 15. (FIG. 2d)

Figure 3:
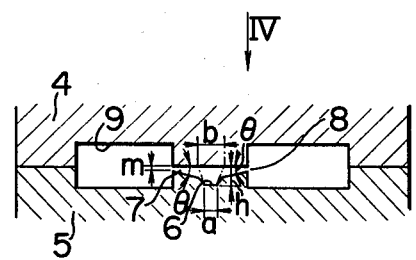
Figure 4:
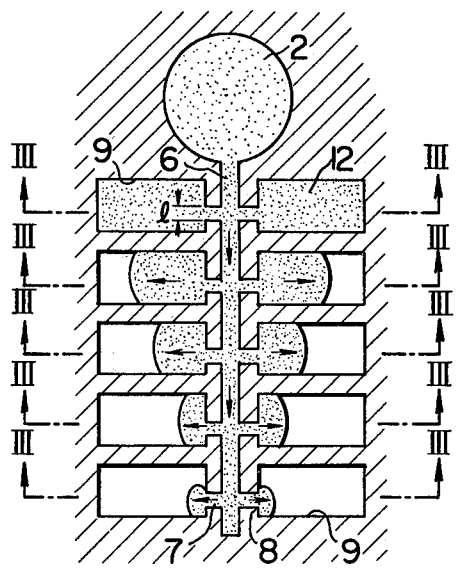

Description is given of the detailed construction of a mold die having multiple cavities, and the filling condition of molten resin within a mold die, with reference to FIGS. 3 and 4.

FIG. 3 is a cross-sectional view taken along the line III — III of FIG. 4 which is a plan view of the mold die. FIG. 4 is a view, as seen from the direction of IV, showing that the cavities located closest to the pot 2 have just been filled up with resin 12. Similar parts are designated by similar reference numerals to those in FIGS. 1 and 3.

As shown in FIG. 4, two or more pairs of cavities 9 (in this case, 10 cavities) are provided for a single pot 2, which pairs of cavities are spaced from one another on one side of the pot. The runner 6 leading to the pot 2 has a cross-section, which is taken at a right angle to the flow direction of molten resin and is in the form of an inverted trapezoid (top side = $b$, bottom side = $a$, height = $h$, $a < b$). The cross-section of the runner 6 is uniform along the length thereof. In addition, the cross-sectional areas (height = $m$, width = $l$) of the respective exits 8 leading into the respective cavities 9 and convergent slopes $\theta$ thereof are constant, respectively.

A mold die which aims at attaining the second object of the present invention is referred to as "Runner and Gate Slopes' Variation type mold die", for which RGV type mold type is short.

Figure 5:
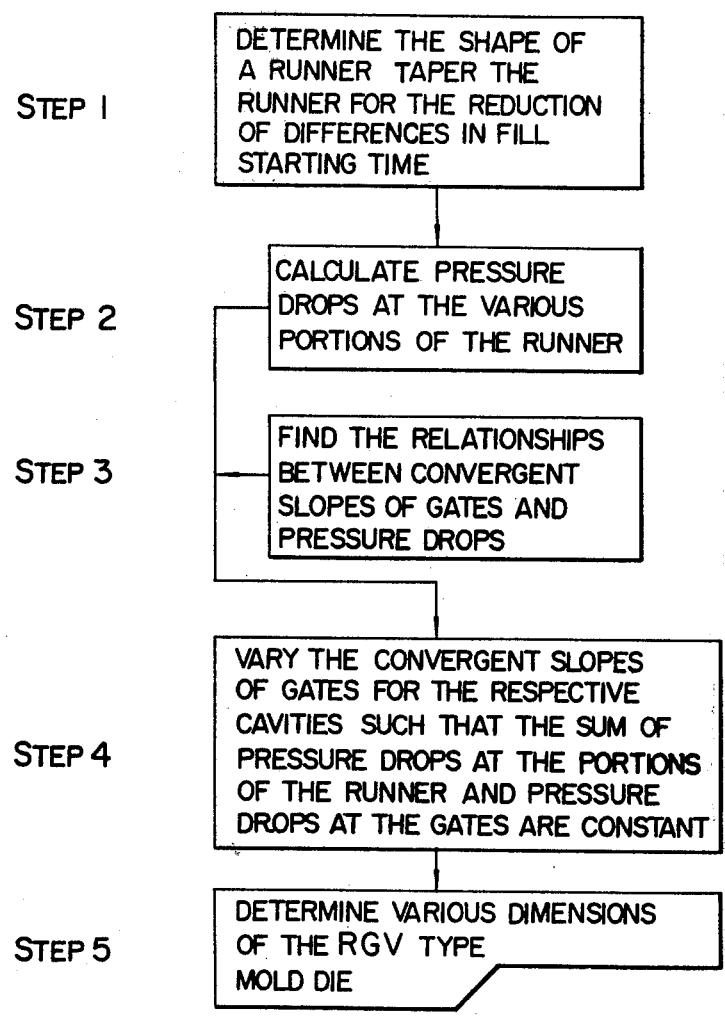
FIG. 5 is a flow chart of the manufacturing process of a mold die, which minimizes a difference in fill starting time of resin into cavities as well as equalizes velocities of resin flowing into respective cavities.

The procedure for the design of a RGV type mold die will be described with reference to the steps 1 to 5 in FIG. 5.

Step 1

The shape of the runner is determined such that the cross-sectional area of the runner is progressively reduced in the direction away from the pot.

Step 2

Pressure drops ($\Delta P_R$) are calculated for portions of the runner which portions extend in each runner portion up to the cavity is determined to the respective pairs of cavities and of which shape has been determined according to the Step 1.

Figure 13:
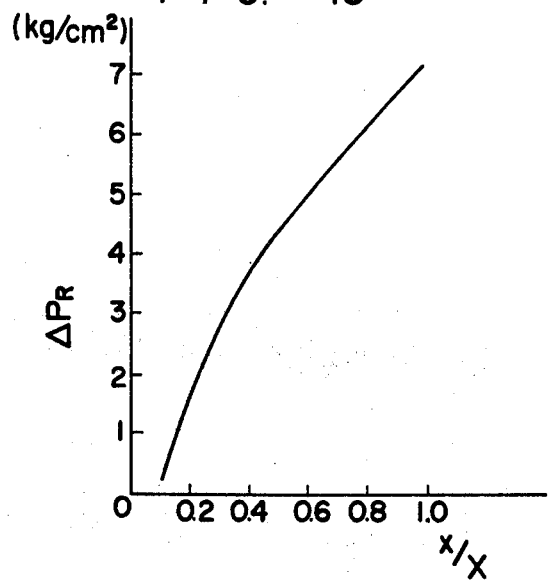

The pressure drops ($\Delta P_R$) tend to be progressively increased in the direction away from the pot, as shown in FIG. 13 (as x/X is increased.

Step 3

Figure 14:
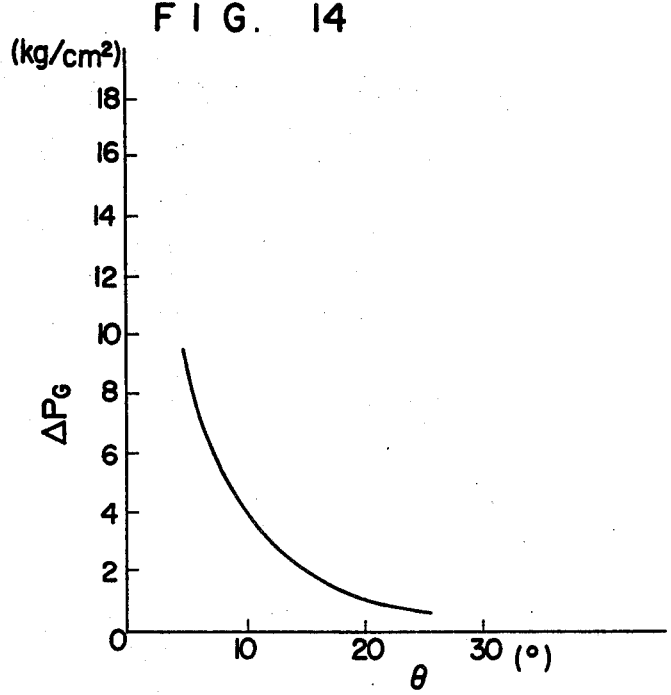

The relationship between the convergent slope of the gate and pressure drop $\Delta P_G$ at the gate is found. $\Delta P_G$ tends to be progressively decreased (as shown in FIG. 14) as the convergent slope $\theta$ increases.

Step 4

The convergent slopes $\theta_1$, $\theta_2$, $\theta_3$ . . . of gates for respective cavities are determined which satisfy the following equation (1) by utilizing the results of calculations obtained in the steps 3 and 4.

$$\Delta P_R (x/X) + \Delta P_G (\theta) = \text{constant} \tag{1}$$

wherein $\Delta P_R (x/X)$: pressure drop in a portion of the runner
$\Delta P_G (\theta)$: pressure drop in a gate Both $\Delta P_R$ and $\Delta P_G$ exhibit tendencies as shown in FIGS. 13 and 14, so that the following inequality (2) positively holds good among the convergent slopes $\theta_1$, $\theta_2$, $\theta_3$ . . . which satisfy the equation (1).

$$\theta_1 < \theta_2 < \theta_3 < \qquad (2)$$

where suffixes 1, 2, 3 . . . represent Nos. of cavities, and designate 1, 2, 3 . . . in the order of the cavities which are closer to the pot.

Step 5

Various dimensions other than those obtained in the steps 1 to 4 are determined, thus completing the design of the RGV type mold die.

Description will now be given as to how the mold die according to the present invention is applied dependent on the types of resin.

In the molding of thermoplastic resin, mold products of uniform quality can be obtained if velocities of resin filling respective cavities are substantially constant. Accordingly, it suffices that the convergent slopes of gates be selected so as to satisfy the equation (1). In other words, it suffices if the first object of the invention can be attained.

In the molding of thermoset resin, if the resin is subject to gelation in the course of filling cavities, then the quality of mold products is materially influenced. It does not suffice that the convergent slopes of gates be selected so as to satisfy the equation (1). It is necessary to reduce differences in fill starting time taken for filling the cavities as much as possible due to the progressive decrease in the cross-sectional area of the runner in the direction away from the pot. Consequently, it is advisable to adopt the RGV type mold die.

The present invention will now be described in more detail in conjunction with the accompanying drawings which indicate the embodiments of the invention.

FIGS. 6 to 8e shows the first embodiment of the invention, in which there is provided a RGV type mold die having a runner 6 directly connected to a pot 2 and five pairs of cavities connected to the runner 6. FIG. 7 is a plan view of the mold die. FIG. 6 is a cross-sectional view taken along the line VI — VI of FIG. 7, that is, a longitudinal cross-sectional view of the runner 6. The width W of the runner 6 is constant along the entire length thereof, while the height h of the runner is progressively decreased. In other words, the cross-sectional area of the runner is linearly reduced in the flow direction of molten resin. FIGS. 8a to 8e, respectively are longitudinal cross-sectional views of the respective gates 7, branching from the runner 6 to the respective cavities, taken long the lines VIIIA — VIIIA, VIIIB — VIIIB, VIIIC — VIIIC, VIIID — VIIID, VIIIE — VIIIE of FIG. 7, which lines are arranged in order of distances from the pot 2. The pairs of cavities are numbered 1 to 5 in order of distances from the pot 2. The numerals of the respective cavities are suffixed to the convergent slopes $\theta$ of the respective gates. The convergent slopes $\theta_1$ to $\theta_5$ of the gates are determined so as to satisfy the aforesaid equation (1). Accordingly, the following inequality (2)' holds good for the convergent slopes $\theta_1$ to $\theta_5$.

$$\theta_1 < \theta_2 < \theta_3 < \theta_4 < \theta_5 \qquad (2)'$$

With the aforesaid arrangement, the fluid velocity of molten resin 12 flowing along the runner 6 is increased as the molten resin goes away from the pot, as compared with that of molten resin in the prior art mold die. Accordingly, differences in fill starting time of molten resin 12 in respective cavities 9 are reduced.

In addition, a pressure drop of resin in a gate portion is so designed as to be decreased, as the gate is spaced farther from the pot, so that the velocities of resin filling respective cavities may be equalized. Accordingly, differences in filling completion time are reduced.

Figure 9:
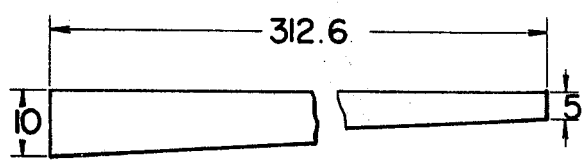
Figure 10:
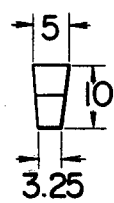
Figure 11:
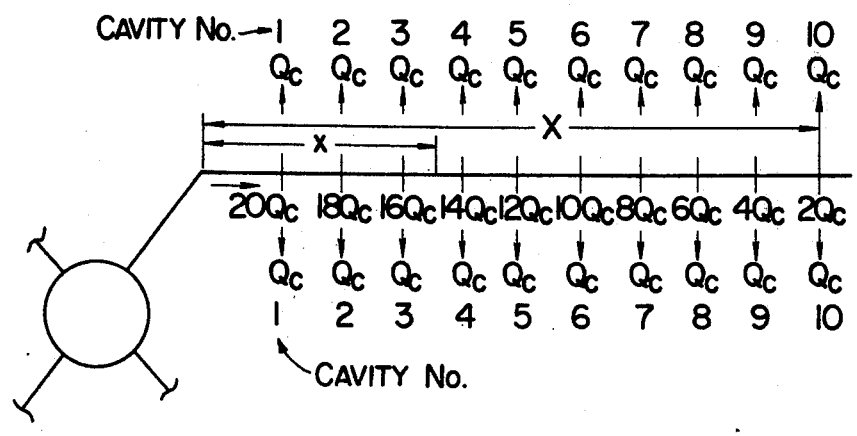
Figure 12:
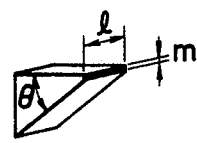

FIGS. 9 to 12 show a second embodiment of the invention, in which there is provided a RGV type mold die having a runner 6' and ten pairs of opposed cavities connected to the runner 6. FIG. 9 is a side elevational view of a runner of a RGV type mold die. FIG. 10 is a front elevational view of the runner. The width of the runner is uniform along the entire length thereof while the height of the runner are varied such that the ratio of the height is 2:1 at the lengthwise ends of the runner. (unit of dimension is 'mm'). FIG. 11 shows the arrangement of cavities. The volume flow rates of molten resin at the runner portions and cavities are shown in FIG. 11 when molten resin flows into cavities at the same velocity. In the drawing, $Q_c$ represents a volume flow rate of molten resin flowing into a cavity. FIG. 12 shows the configuration of a gate. A convergent slope $\theta$ of the gate will be determined in the following manner.

When commercially available novalc-epoxy resin A was filled in the RGV type mold die as shown in FIGS. 9 to 12, the pressure drop $\Delta P_R$ in the runner portions, and pressure drop $\Delta P_G$ in the gate portions as a function of a convergent slope $\theta$ were calculated by using the viscosity of molten resin, volume flow rate of resin in the cavities, and dimensions of the mold die.

FIG. 13 shows a slot in which abscissa represents non-dimensional length $x/X$ which represents a ratio of a distance $x$ from the end of runner to the entire length $X$ of the runner, and ordinate represents the pressure drop $\Delta P_R$ in the runner portion.

FIG. 14 shows a plot in which abscissa represents the convergent slopes $\theta$ of the gates and ordinate represents the pressure drop $\Delta P_G$ at the gate portions.

By using the results shown in FIGS. 13 and 14, convergent slopes $\theta_2, \theta_3 \ldots \theta_{10}$ were calculated at a given value 6.0° of $\theta_1$ in a manner that the sums of $\Delta P_R$ and $\Delta P_G$ in respective cavities became equal to one other. $\theta_1$ may be suitably determined taking the workability of gates into consideration. Table 1 shows convergent slopes of gates for respective cavities, which were determined in the above-mentioned manner.

Table 1

| Cavity No. | x/X | $\theta^{(\circ)}$ | $\Delta P_R$ (kg/cm$^2$) | $\Delta P_G$ (kg/cm$^2$) | Sum of pressure drops (kg/cm$^2$) |
| --- | --- | --- | --- | --- | --- |
| 1 | 0.045 | 6.0 | 0.3 | 7.6 | 7.9 |
| 2 | 0.143 | 6.5 | 1.3 | 6.6 | 7.9 |
| 3 | 0.240 | 7.5 | 2.2 | 5.7 | 7.9 |
| 4 | 0.338 | 8.5 | 3.15 | 4.75 | 7.9 |
| 5 | 0.436 | 9.5 | 3.95 | 3.95 | 7.9 |
| 6 | 0.545 | 11.0 | 4.7 | 3.2 | 7.9 |
| 7 | 0.643 | 13.0 | 5.35 | 2.55 | 7.9 |
| 8 | 0.740 | 15.0 | 5.90 | 2.9 | 7.9 |
| 9 | 0.838 | 17.5 | 6.50 | 1.4 | 7.9 |
| 10 | 0.936 | 21.0 | 6.90 | 1.0 | 7.9 |

A mold die having the dimensions shown in the second embodiment was manufactured, and the filling of resin into the cavities was investigated.

Figure 15:
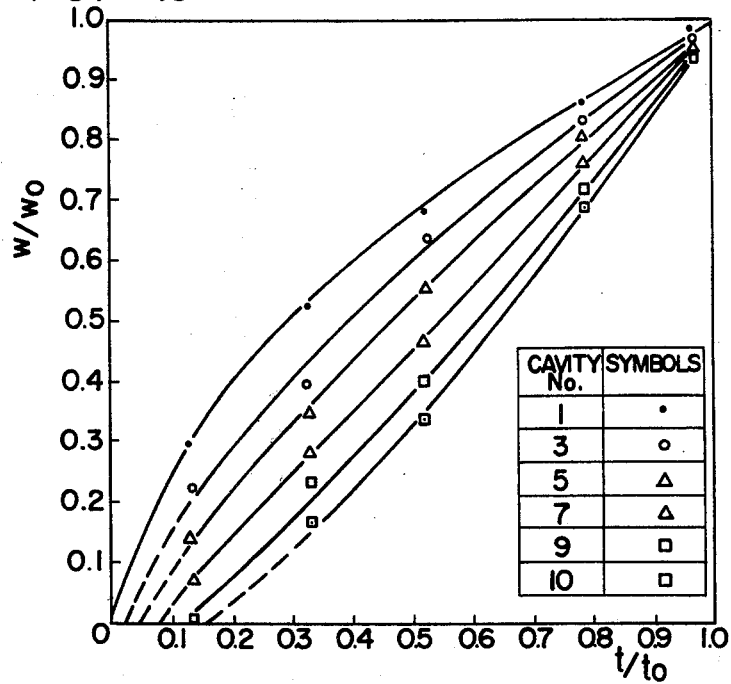
FIG. 15 is a plot illustrative of the filling condition in a mold die according to the second embodiment of the invention.
Figure 16:
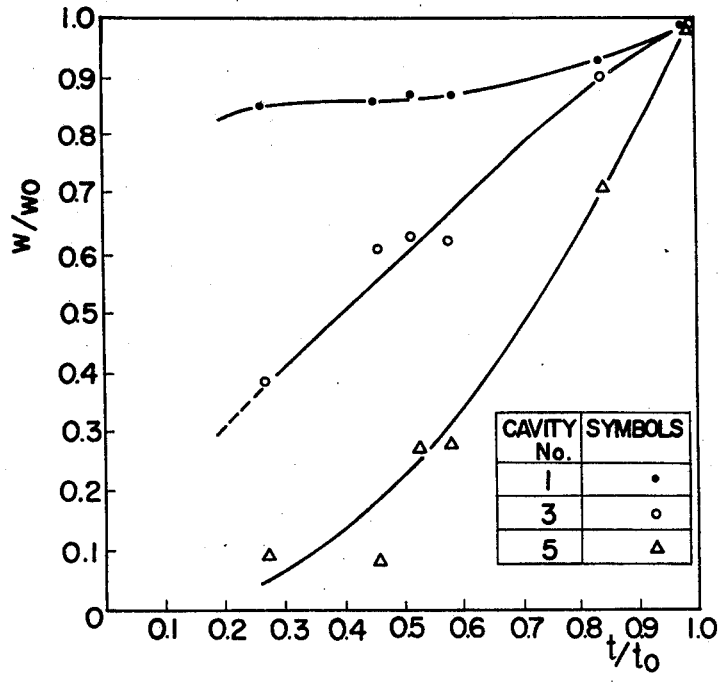
FIG. 16 is a plot illustrative of the filling condition in a prior art mold die.

FIG. 15 shows the result of measurement in the filling of resin in a mold die having dimensions as shown in the second embodiment, and FIG. 16 shows the result of measurement in the filling of resin in a prior art mold die for the purpose of comparison. (The number of cavities is half that of the second embodiment: Cavity Nos. 1 to 5). In FIGS. 15 and 16, abscissa represents a non-dimensional time $t/t_o$ obtained by dividing the time period $t$ from the fill starting time for cavity of No. 1 by the time period $t_o$ taken up to the completion of filling of resin in the all cavities, and ordinate represents a non-dimensional fill rate $W/W_o$ obtained by dividing the weight $W$ of resin present in the cavity by the weight $W_o$ of resin in the cavity at the completion of filling.

For instance, in FIG. 15, a curve connecting marks (o) representing the measurements for cavity of No. 3 indicates how many percent of resin represented by $W/W_o \times 100\%$ is filled into cavity of No. 3 during the time period from the time when resin from the pot starts being filled into cavity of No. 1 to the time ($t/t_o = 1$) when cavity of No. 10 has been filled up with resin. In addition, the gradient of the curve represents the fill velocity of resin.

The comparison of FIG. 15 with FIG. 16 with respect to the difference in apparent fill completion time ($W/W_o = 0.8$) shows that $t/t_o$ is 0.5 between the cavities of Nos. 1 and 5 in the prior art mold die, and that $t/t_o$ is reduced to 0.25 between the cavities of Nos. 1 to 10 in the embodiment of the invention, despite the fact that the number of cavities is doubled.

The fill velocities of resin into respective cavities are substantially equal in this embodiment.

Furthermore, die-penetration rates for IC packages which have been molded in the RGV type mold die according to the second embodiment of the invention as well as in the prior art mold die were compared for each cavity. Meant by the term "die penetration rate" as used herein is a ratio of a distance, over which red ink penetrates through a clearance between a lead frame and resin when a mold product is dipped in pressurized red ink for a predetermined time of period, relative to the entire length of the lead frame. The test results reveal that the die-penetration rate is substantially decreased in the RGV type mold die having the number of mold products doubled, as compared with the die-penetration rate in the prior art mold die. In addition, the difference in die-penetration rate dependent upon the positions of cavities was large in the prior art mold die, but it was removed in the RGV type mold die.

As the third embodiment of the present invention, void formation rate and failure rate of the deformation in gold wire interconnection were compared between IC packages which have been molded in the RGV type mold die of the present invention as well as in the prior art mold die. The both mold dies used were provided with the same number of cavities, and commercially available novalc epoxy resin B was filled in the mold dies. The test results indicate that the void formation rate in the RGV type mold is reduced about half of that in the prior art mold die, and that the failure rate of the deformation in gold wire inteconnection in the RGV type mold die was reduced to about ⅓ of that obtained in the prior art mold die.

The convergent slopes $\theta$ of the gates in the RGV type mold die according to the first to third embodiments were determined so as to satisfy the equation (1), so that the convergent slopes are increased as the gate is positioned farther from the pot. This is represented by inequality (2).

Alternatively, the convergent slopes of gates per group (for instance, three on each side of runner) may be increased jointly within an allowable range of filling performance. This contributes to saving in manufacturing cost of a mold die, as compared with the RGV type mold die.

While description has been given thus far of the transfer mold, wherein resin in a tablet form is placed in a pot, the present invention may likewise be applied to the injection mold, wherein molten resin is introduced into a sprue.

As is apparent from the foregoing description of the mold die according to the present invention, the cross-sectional area of the runner in a mold die is progressively reduced in the direction away from the pot, and the convergent slopes of gates are so determined that the sum of a pressure drop in a runner portion and a pressure drop in a gate portion may be maintained equal for each of cavities, so that a difference in fill time for respective cavities may be minimized, and resin may be introduced into cavities at the same velocity.

As a result, the internal void formation rate and the failure rate of the deformation in gold wire interconnection in products may be reduced to a large extent, as compared with those of the products molded according to the prior art mold die, and hence the consistent quality may be achieved with the resulting improvement in yield of products.

Still furthermore, mold products may be readily removed from the runner in the same manner as in the prior art mold die.

What is claimed is:

1. A mold die comprising:
  a plurality of cavities;
  a pot or sprue for supplying a molten resin therefrom;
  a runner connected at one end thereof to said pot or sprue and extending therefrom toward said cavities so that the cavities are provided along the runner for introducing resin from said pot or sprue to said cavities; and
  a plurality of gates branching from said runner and connected to respective cavities, each of said gates having an inlet communicating with the runner and an exit communicating with an associated cavity, and convergent sloping portions extending between the inlet and exit of the respective gates, each of the exits of each of the gates being of the same size and cross-sectional configuration;
  said convergent sloping portions of the respective gates having an increasing inclination with an increase in distance of the corresponding cavities from the pot or sprue such that with the increasing inclination and the exits of the same size and cross-sectional configuration the sum of a pressure drop in said runner and a pressure drop in each gate is maintained substantially equal for the respective cavities.

2. A mold die comprising:
  a plurality of cavities;
  a pot or sprue for supplying a molten resin therefrom;
  a runner connected at one end thereof to said pot or said sprue and extending therefrom toward said cavities so that the cavities are located along said runner; and
  a plurality of gates each branching from said runner and being respectively connected to said cavities, each of said gates having an inlet communicating with the runner and an exit communicating with an associated cavity, and convergent sloping portions extending between the inlet and exit of the respective gates, each of the exits of each of the gates having the same size and cross-sectional configuration;

said runner having a cross-sectional area which progressively decreases in a direction away from said pot or sprue; and said convergent sloping portions of the respective gates having an increasing inclination with an increasing distance of the corresponding cavities from the pot or sprue so that with the increasing inclinations and exits of the same size and cross-sectional configuration the sum of pressure drops for the respective cavities in a runner connecting the pot or sprue and the cavity and in the gate therefor is maintained equal for each of said cavities.

* * * * *